United States Patent [19]

Endo et al.

[11] Patent Number: 5,102,957
[45] Date of Patent: Apr. 7, 1992

[54] NOVEL BLOCK COPOLYMER OF STYRENE AND ETHYLENE

[75] Inventors: Kiyoshi Endo, Osaka; Takayuki Otsu, Nara, both of Japan

[73] Assignee: Idemitsu Kosan Company Limited, Tokyo, Japan

[21] Appl. No.: 511,467

[22] Filed: Apr. 20, 1990

[30] Foreign Application Priority Data

May 12, 1989 [JP] Japan .................................. 1-117452

[51] Int. Cl.⁵ .................... C08L 297/02; C08L 297/08
[52] U.S. Cl. .................................... 525/324; 525/259; 525/271
[58] Field of Search ........................ 525/324, 250, 259

[56] References Cited

U.S. PATENT DOCUMENTS

| | | | |
|---|---|---|---|
| 3,478,129 | 11/1969 | Kern et al. | 525/324 |
| 3,634,598 | 1/1972 | Harwell et al. | 525/324 |
| 3,894,117 | 7/1975 | Agouri et al. | 525/240 |
| 4,668,746 | 5/1987 | Delaney | 525/250 |
| 4,762,893 | 8/1988 | Nocci et al. | 525/324 |
| 4,960,842 | 10/1990 | Lo et al. | 525/250 |

FOREIGN PATENT DOCUMENTS 273228  7/1988  European Pat. Off. .
1121195 7/1968  United Kingdom .

Primary Examiner—Carman J. Seccuro
Attorney, Agent, or Firm—Wyatt, Gerber, Burke and Badie

[57] ABSTRACT

A novel method is proposed for the preparation of a block copolymer of styrene and ethylene having a very narrow molecular weight distribution and controlled molar ratio of the styrene moiety to ethylene moiety in a high efficiency. The method comprises the steps of: (a) living-polymerizing styrene by using an organic lithium compound as a polymerization initiator; (b) admixing the polymerization mixture containing the living polymer of styrene with a tertiary diamine compound, such as N,N,N',N'-tetramethyl ethylene diamine; and (c) introducing ethylene monomer into the polymerization mixture to effect polymerization of ethylene on to the living polymer molecules of polystyrene.

1 Claim, 3 Drawing Sheets

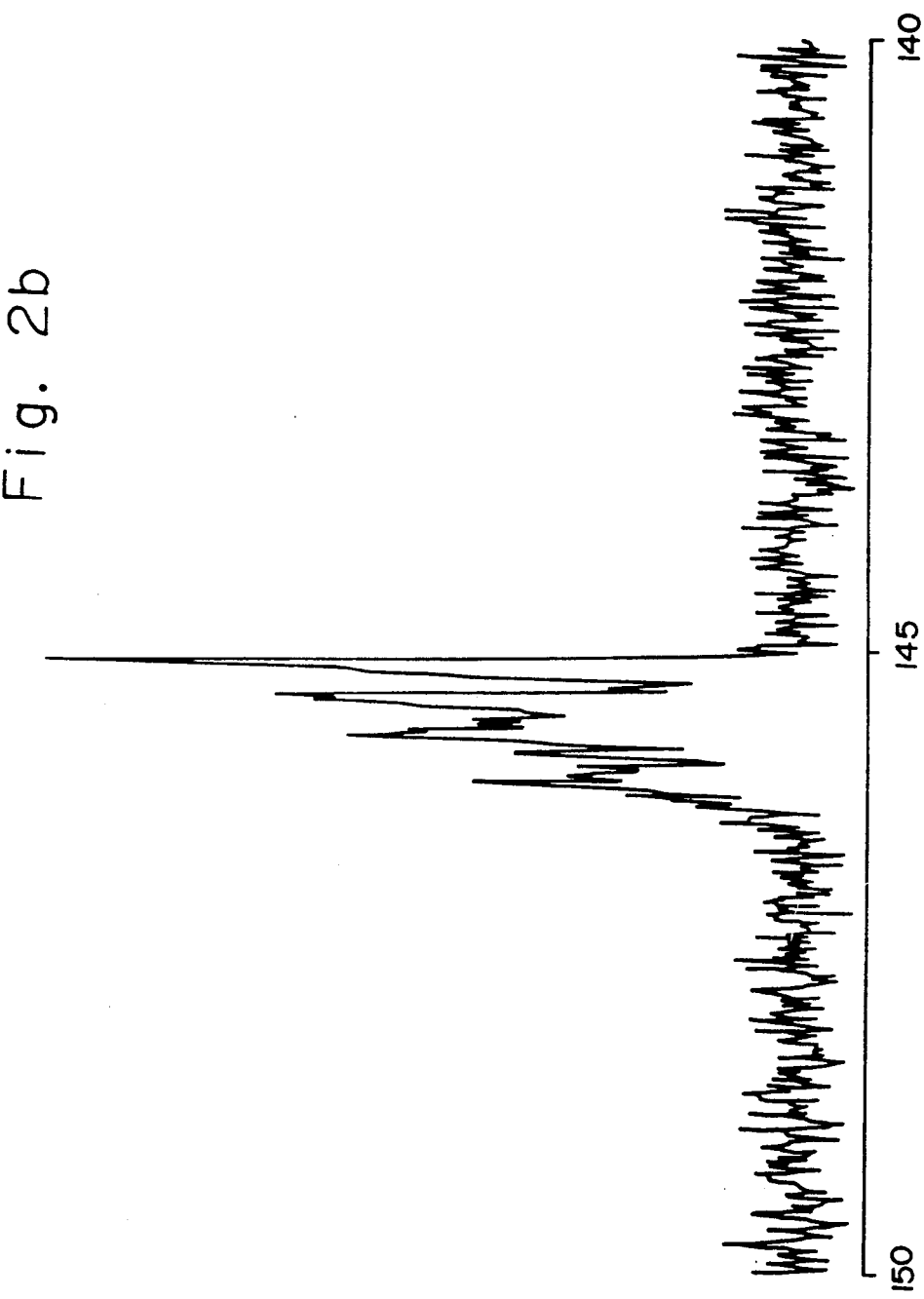

NOVEL BLOCK COPOLYMER OF STYRENE AND ETHYLENE

BACKGROUND OF THE INVENTION

The present invention relates to a novel block copolymer of styrene and ethylene and a method for the preparation thereof. More particularly, the invention relates to a block copolymer of styrene and ethylene having an outstandingly narrow molecular weight distribution of the molecules and imparted with the advantageous properties of both of two polymers including high impact strength, flexibility and selective gas permeability of polyethylenes and rigidity and transparency of polystyrenes as well as an efficient method for the preparation of an ethylene-styrene block copolymer by which the proportion between the contents of the polystyrene segments and polyethylene segments and the molecular weight thereof can be freely controlled.

A block copolymer is a copolymer composed of two kinds or more of polymeric segments of different types bonded together blockwise and has a possibility of being imparted with useful properties not obtained with either one of the homopolymerized base polymers by the compensation of the defective properties for each other. Accordingly, intensive investigations are under way in recent years to develop various kinds of novel block copolymers by combining two or more base polymers having greatly different properties. For example, attempts are being made to combine polar and nonpolar segments, crystalline and amorphous segments, rigid and flexible segments, hydrophobic and hydrophilic segments and other types of polymeric segments having oppositely different properties or to combine two types of polymeric segments having greatly differing property parameters such as the glass transition temperature, melting point and the like with an object to utilize the block copolymer as a high-impact resin as such, component of so-called polymer blends, non-vulcanization type rubber, selective gas-permeable membrane, biofunctional material, polymeric liquid crystal and the like as only several of the highlighted applications.

As is known, each of polystyrenes and polyethylenes is widely used in a variety of application fields. Each of polystyrene and polyethylene has its own advantages and disadvantages. For example, polystyrene resins are defective in their relatively low impact strength and flexibility while polyethylene resins have defects in their low transparency and rigidity. These defects in the properties naturally limit the applicability of the respective resins when either one of the resins is utilized alone.

Attempts and proposals have of course been made to copolymerize styrene and ethylene with an object to obtain a copolymer imparted with properties as a combination of the different properties of the two different polymers The copolymer of styrene and ethylene obtained by the simple copolymerization of a monomer mixture of styrene and ethylene, however, is a so-called random copolymer in which the monomeric moieties of styrene and ethylene are distributed and bonded together at random with absolutely no regularity so that the copolymer not always has a desirable property not possessed by either one of polystyrenes and polyethylenes. Accordingly, it would be a promising way that the copolymer has a blockwise structure composed of the segments of polystyrene and segments of polyethylene in order to obtain a polymeric resin having properties as a combination of the advantageous properties of a polystyrene and a polyethylene.

Unfortunately, no efficient and versatile methods are known in the prior art for the preparation of a block copolymer of styrene and ethylene. For example, U.S. Pat. No. 4,668,746 teaches a method for the preparation of a copolymer containing the moiety of ethylene in segments, in which ethylene is subjected to the living copolymerization with a complex of an alkyl lithium and N,N'-ethylene dipyrrolidine as a polymerization initiator or to the block copolymerization of ethylene and a monomer copolymerizable therewith by anionio polymerization. This method, however, is not advantageous because of the low living polymerizability of ethylene resulting in a broad distribution of the molecular weight in addition to the problem of the difficulty in the removal of the homopolymeric polyethylene contained in the product in a considerably large amount due to the low efficiency of block copolymerization. British patent No. 1,121,195 teaches a polymerization method by using an organic lithium compound and an amino complex. This method, however, is not practically applied to the preparation of a block copolymer of styrene and ethylene. Further, no block copolymer of styrene and ethylene can be obtained by the method disclosed in Japanese patent Publication No. 40-26301 for the copolymerization of styrene and ethylene by using a catalyst system composed of ethylene, titanium tetrahalide and an organic tin halide.

Recently, a method is proposed in European Polymer Journal, volume 17, page 1175 (1981), Journal of Polymer Science, Polymer Chemistry Edition, volume 22, page 3877 (1984) and Die Makromolekulare Chemie, volume 188, page 103 (1987) for the preparation of a block copolymer of styrene, butadiene and ethylene by the living polymerization of styrene and butadiene followed by the reaction of the active species with titanium tetrachloride and then introduction of ethylene into the polymerization mixture. This method, however, is questionable as a method for the preparation of a block copolymer of styrene and ethylene in the absence of any confirmatory report for the formation of such a binary block copolymer.

As to the preparation of a block copolymer containing polystyrene segments, it is reported that anionic living polymerization of styrene is initiated using an alkyl lithium and then a diene monomer is copolymerized with the living polymer of styrene by the combined use of a basic ether compound such as diphenyl ether and anisole. No report is available, however, on the applicability of this method to the preparation of a block copolymer of styrene and ethylene.

SUMMARY OF THE INVENTION

The present invention accordingly has an object to provide a novel and improved block copolymer of styrene and ethylene having excellent impact strength, flexibility and selective gas permeability inherent in polyethylenes and high rigidity and transparency inherent in polystyrenes as well as to provide a novel and reliable method for the preparation of such a block copolymer of styrene and ethylene.

Thus, the block copolymer of styrene and ethylene of the invention consists of a blockwise sequence of polystyrene segments and polyethylene segments, of which the molar ratio of the styrene moiety to the ethylene moiety is in the range from 0.1:99.9 to 99.9:0.1 and the number average molecular weight is in the range from 1,000 to 500,000, preferably, with a ratio of the weight-average molecular weight $M_w$ to the number-average molecular weight $M_n$, i.e. $M_w:M_n$, in the range from 1.0 to 1.3.

Further, the inventive method for the preparation of the above defined block copolymer of styrene and ethylene comprises the steps of:

(a) subjecting styrene monomer to living polymerization to form living polymer molecules of styrene;

(b) admixing the living polymer of styrene with a tertiary diamine compound; and (c) introducing ethylene monomer to the mixture of the living polymer of styrene and the tertiary diamine compound to effect polymerization of the ethylene monomer with the living polymer molecules of styrene.

BRIEF DESCRIPTION OF THE DRAWING

FIG. 1 is an infrared absorption spectrum and FIGS. 2a and 2b are each a part of a $^{13}$C-NMR spectrum of the block copolymer obtained in Example 1.

DETAILED DESCRIPTION OF THE PREFERRED EMBODIMENTS

Figure 1:
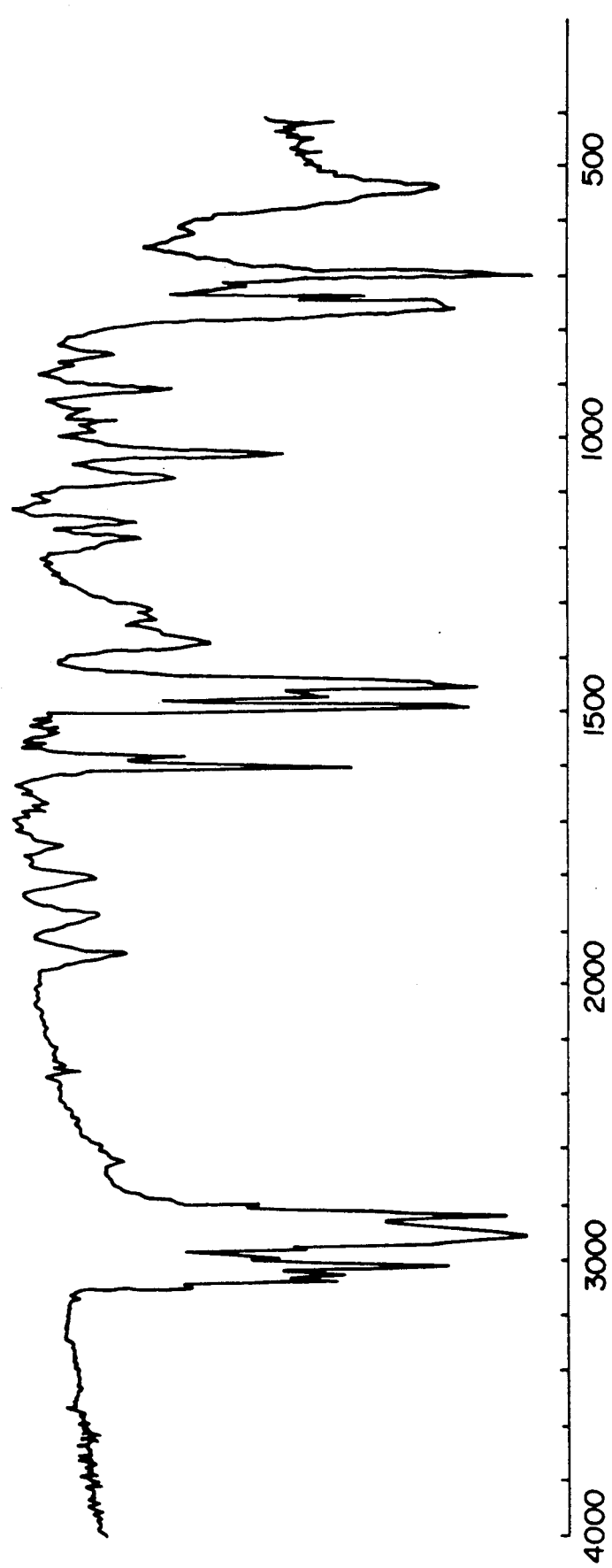

As is described above, the inventive method for the preparation of a block copolymer of styrene and ethylene comprises the three essential steps of (a) to (c), according to which a reliable means is obtained for controlling the proportion of the polystyrene segments and the polyethylene segments and the molecular weight and distribution thereof in the block copolymer within the above specified ranges.

In the first step (a) of the inventive method, styrene monomer is subjected to a process of living polymerization so as to form living polymer molecules of styrene. The method for the living polymerization of styrene is not particularly limitative and any of the conventional methods can be used. For example, styrene is polymerized in a suitable organic solvent at a temperature in the range from $-30°$ to $200°$ C. or, preferably, from $10°$ to $80°$ C. or, more preferably, from $20°$ to $50°$ C. for a length of time of, for example, 1 minute to 200 hours in the presence of an organic lithium compound represented by the general formula $$R—Li. \qquad (I)$$

in which R in a monovalent hydrocarbon group selected from the class consisting of alkyl, alkynyl and aryl groups having 1 to 20 carbon atoms, so that living polymer molecules of styrene can be obtained. The polymerization reaction is performed, usually, under normal pressure though not particularly limitative thereto.

Particular examples of the monovalent hydrocarbon group denoted by R in the general formula (I) include methyl, ethyl, n-propyl, isopropyl, n-butyl, isobutyl, sec-butyl, tert-butyl, n-pentyl, 2-pentyl, 3-pentyl, isoamyl, hexyl, heptyl, octyl, cyclopentyl, cyclohexyl, allyl, vinyl, phenyl and benzyl groups, of which secondary alkyl groups such as sec-butyl group and the like are particularly preferable. Examples of the organic solvent used in the above mentioned living polymerization of styrene include aliphatio hydrocarbons such as pentane, hexane, heptane and octane, alicyolic hydrocarbons such as cyclopentane and cyolohexane and aromatic hydrocarbons such as benzene and toluene, of which non-polar aliphatic or alioyolio hydrocarbon solvents capable of dissolving polystyrene are preferred. The above named organic solvents can be used either singly or as a mixture of two kinds or more according to need.

The concentration of the styrene monomer n the polymerization mixture is not particularly limitative but a concentration of about 10 to 30% by weight is usually appropriate from the standpoint of obtaining an adequately high viscosity of the solution after the living polymerization.

The degree of polymerization of the living polymer molecules of styrene can be controlled by suitably selecting the molar proportion of the styrene monomer and the organic lithium compound in the polymerization mixture for the living polymerization. Assuming that the desired degree of polymerization of the living polymer molecules of styrene is n, for example, the organic lithium compound is used in such an amount that the molar ratio of the styrene monomer to the organic lithium compound is equal to n.

In step (b) of the inventive method, the living polymer of styrene obtained in step (a) in the form of a solution is admixed with a tertiary diamine compound which serves to modify the activity of the living polymer molecules. The effect of activity modification can be evidenced by the shift in the ultraviolet absorption band and discoloration of the solution by the addition of the tertiary diamine compound. The above mentioned tertiary diamine compound is represented by either one of the general formulas $$R^1R^2N—Z^1—NR^3R^4, \qquad (II)$$

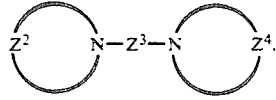
(III)

and

(IV)

in which $R^1$, $R^2$, $R^3$, $R^4$, $R^5$ and $R^6$ are, each independently from the others, a monovalent hydrocarbon group having 1 to 20 carbon atoms selected from the class consisting of alkyl, alkenyl and aryl groups and $Z^1$, $Z^2$, $Z^3$, $Z^4$, $Z^5$ and $Z^6$ are each independently from the others, a divalent hydrocarbon group having 1 to 20 carbon atoms selected from the class consisting of alkylene, alkenylene and arylene groups.

Particular examples of the group denoted by one of $R^1$ to $R^6$ in the above given general formulas include those given before as the examples of the group denoted by R in the general formula (I). particular examples of the group denoted by one of $Z^1$ to $Z^6$ in the above given general formulas include those expressed by the following formulas —$CH_2$—, —$CH_2CH_2$—, —$CH_2CH(CH_3)$—, —$CH_2CH_2CH_2$—, —$CH_2CH(CH_3)$ $CH_2$—, —$CH(CH_3)CH,CH_2$—, —$CH_2CH_2CH_2CH_2$—, —$CH(CH_3)CH(CH_3)$—, —$CH(CH_2CH_3)CH_2$—, —$CH_2CH(CH_3)$ $CH_2CH_2$—, —$CH(CH_3)CH_2CH_2CH_2$—, —$CH_2CH(CH_2CH_3)CH_2CH_2$—, —CH=CH—, —CH=CHCH_2—, —CH=CHCH=CH—, —CH=C(CH_3)CH=CH—and —$CH_2$—Pn—$CH_2$—, in which Pn is a 1,4 phenylene group.

Examples of the tertiary diamine compound in conformity with the above given definition and suitable for use in the inventive method include N,N,N',N'-tetramethyl ethylene diamine, N,N,N',N'-tetraethyl ethylene diamine, N,N,N',N'-tetra(n-propyl) ethylene diamine, N,N,N',N'-tetra(n-butyl) ethylene diamine, N,N,N',N'-tetra (n-pentyl) ethylene diamine, N,N,N',N'-tetraneopentyl ethylene diamine, 1,2-dipiperidylethane, 1,2-di(1-pyrrolidinyl)ethane and 1,4-dimethyl piperazine.

Sparteine expressed by the structural formula

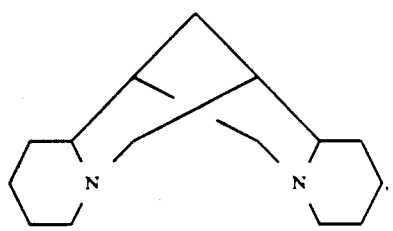
(V)

can also be used as the tertiary dimaine compound belonging to the fourth class. These tertiary diamine compounds can be used either singly or as a combination of two kinds or more according to need. The amount of the tertiary diamine compound added to the solution of the living polymer of styrene is usually in the range from 0.5 to 10 moles or, preferably, in the range from 1 to 3 moles per mole of the organic lithium compound used in the preparation of the living polymer of styrene.

In step (c) of the inventive method, ethylene monomer is introduced into the living polymer solution admixed with the tertiary diamine compound in step (b) to effect the polymerization of ethylene in the presence of the living polymer of styrene so that the desired block copolymer of styrene and ethylene can be obtained. The polymerization of ethylene in step (c) is performed at a temperature in the range, usually, from $-30°$ to $200°$ C. or, preferably, from $10°$ to $80°$ C. or, more preferably, from $20°$ to $50°$ C. and the polymerization reaction is complete, for example, within 1 minute to 200 hours.

According to the above described method of the invention, the molar proportion of the styrene moiety and the ethylene moiety in the block copolymer as well as the degree of polymerization thereof can be controlled to meet the particular object of application by suitably selecting the conditions in the living polymerization of styrene monomer in step (a) and the conditions in the polymerization of ethylene in step (c).

Namely, the block copolymer prepared by the inventive method consists of a blockwise sequence of the polystyrene segments expressed by the formula

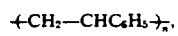

in which n is a positive integer indicating the degree of polymerization of the segment, and the polyethylene segments expressed by the formula

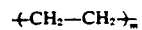

in which m is a positive integer indicating the degree of polymerization of the polyethylene segment. According to the inventive method, the molar proportion of the styrene moiety to the ethylene moiety can be freely controlled in the range from 0.1:99.9 to 99.9:0.1 or, from the standpoint of practical application of the block copolymer, in the range from 20:80 to 80:20. Further, the number-average molecular weight $M_n$ of the block copolymer can be controlled in the range from 1,000 to 500,000. This limitation in the molecular weight is given because a copolymer having a number-average molecular weight $M_n$ smaller than 1,000 cannot give a molded article having excellent mechanical properties while a copolymer having a number-average molecular weight $M_n$ larger than 500,000 may be poor in respect of the workability in molding.

In addition, the block copolymer of styrene and ethylene obtained by the inventive method has a very unique characteristic that the molecular weight distribution of the molecules is very narrow as is shown by the ratio of the weight-average molecular weight $M_w$ to the number-average molecular weight $M_n$, i.e. $M_w:M_n$, usually, in the range from 1.0 to 1.3.

The inventive block copolymer of styrene and ethylene described above is a novel substance in respect of the very narrow molecular weight distribution. Furthermore, the inventive block copolymer can be imparted with excellent impact strength, flexibility and selective gas permeability inherent in polyethylene and high rigidity and transparency inherent in polystyrenes in combination by suitably controlling the molar proportion of the styrene moiety and ethylene moiety and the molecular weight so that the inventive block copolymer may have versatility in a wide field of applications, for example, as structural materials, files, components in resin blinds and the like. A block copolymer having a number-average molecular weight of 1,000 to 20,000 is particularly suitable as a compatibility-improving constituent of a polymer blend while a block copolymer having a number-average molecular weight of 20,000 to 500,000 is useful as a material of films or structural members. In addition, the inventive method is also advantageous in respect of the high efficiency for the preparation of the block copolymer.

In the following, the block copolymer of the invention and the method for the preparation thereof are described in more detail by way of examples which, however, never limit the scope of the invention in any way.

The initiator efficiency for the living polymerization $f_1$ appearing in the following examples is a value given by the equation $$f_1, \% = (n_1/n_2) \times 100,$$

in which $n_1$ is the molar ratio of the styrene monomer and the organic lithium compound introduced into the polymerization mixture for the living polymerization and $n_2$ is the ratio of the molecular weight of the polystyrene obtained by the living polymerization to the molecular weight of styrene, i.e. 104. Further, the block conversion efficiency $f_2$ is a value calculated by the equation $$f_2 = (W_1 - W_2)/W_1,$$

in which $W_1$ is the amount of the polystyrene obtained by the living polymerization with the organic lithium compound and $W_2$ is the amount of the homopolymeric polystyrene extracted from the block copolymer of styrene and ethylene according to the disclosure in European Polymer Journal, volume 17, page 1175 (1981).

EXAMPLE 1

Into a glass-made pressure-resistant reactor tube of 300 ml capacity were introduced, after flushing with nitrogen gas, 170 ml of cyclohexane as a solvent and 25 ml or about 0.22 mole of styrene monomer to form a polymerization mixture which was heated at $50°$ C. Then, a 5 ml portion of a cyclohexane solution of sec-butyl lithium having a concentration adjusted to 0.94 mole/liter were added thereto under stirring to initiate the polymerization reaction.

After 5 hours of the polymerization reaction continued in this manner, the polymerization mixture was admixed with N,N,N',N'-tetramethyl ethylene diamine in an amount of 1.5 times by moles relative to the sec-butyl lithium and agitation of the mixture was continued for further 15 minutes.

Thereafter, ethylene monomer was introduced into the reactor tube under pressurization up to a pressure of 2 kg/cm$^2$G, which was maintained for 5 hours to effect polymerization of ethylene at 50° C. followed by releasing of the pressure and addition of isopropyl alcohol to terminate the polymerization reaction. The polymerization mixture was poured into a large volume of methyl alcohol to precipitate the polymer and the precipitates were collected by filtration and dried for 24 hours at 30° C. under reduced pressure to give 28.8 g of a polymeric product. This polymeric product was composed of 56% by moles and 44% by moles of the styrene moiety and ethylene moiety, respectively, as calculated from the $^1$H-NMR data and the yield of the polymer.

FIG. 1 in the accompanying drawing is an infrared absorption spectrum of the thus obtained polymeric product obtained by the KBr disc method. The spectrum has several characteristic absorption bands assignable to the respective structures including the bands at a wave number of around 3000 to 3100 cm$^{-1}$ assignable to the stretching vibration of the C—H bond in the phenyl group, around 2000 to 1600 cm$^{-1}$ assignable to the overtone of the out-of-plane deformation vibration of the phenyl group, around 1600 cm$^{-1}$ and 1495 cm$^{-1}$ assignable to the stretching vibration of the C=C bond in the phenyl group and around 720 cm$^{-1}$ and 725 cm$^{-1}$ assignable to the rocking vibration of the CH$_2$ group.

Figure 2A:
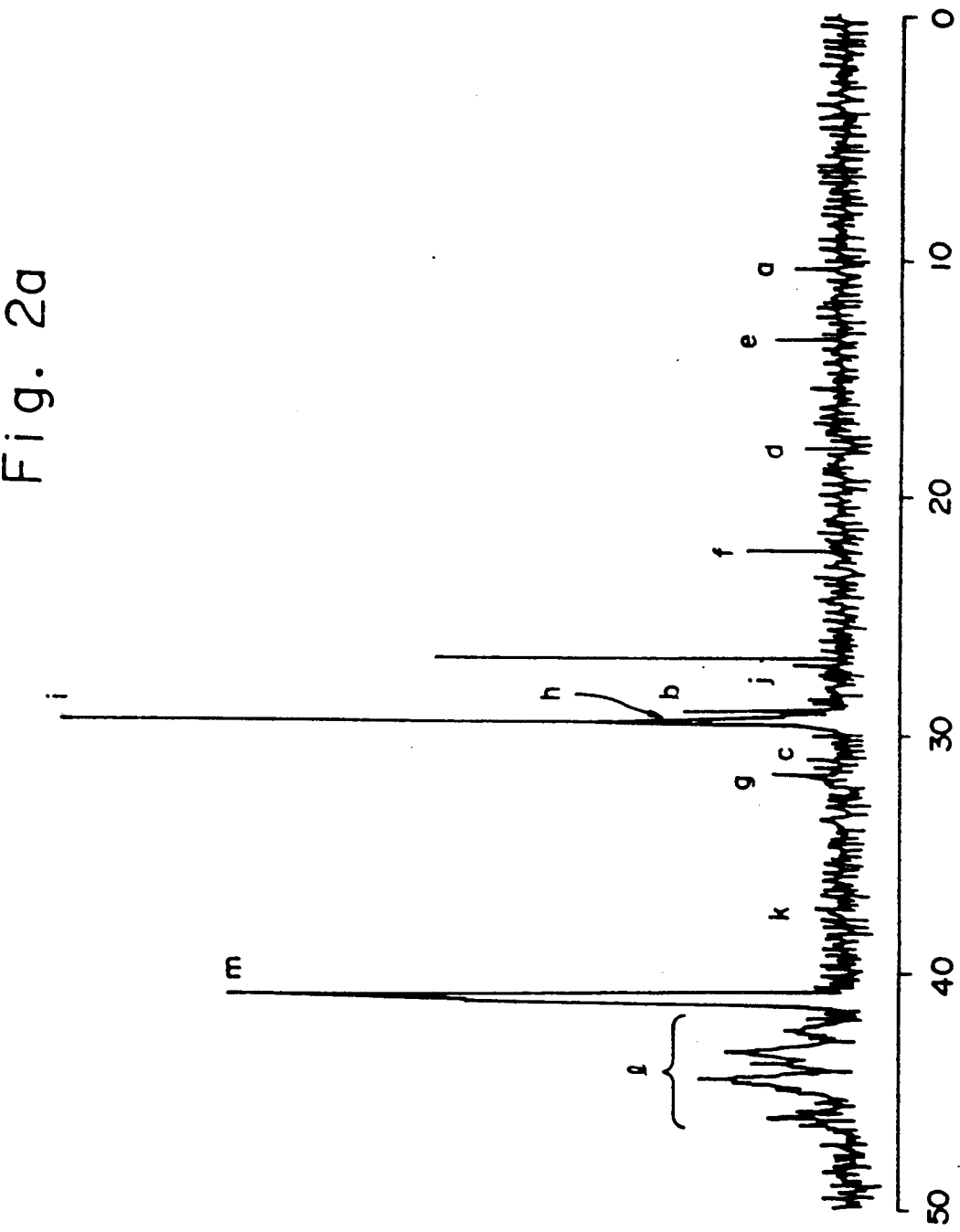

FIGS. 2a and 2b are each a part of a $^{13}$C-NMR spectrum of the polymeric product taken in a solvent mixture of trichlorobenzene and hexadeuterated benzene C$_6$D$_6$ at 130° C. at a frequency of 67 MHz. The symbols a to k indicating the peaks in FIG. 2a refer to the following assignment to the structural formula of the polymer.

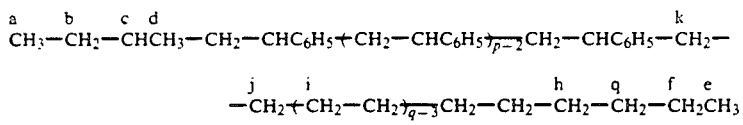

a : 10.5 ppm; b : 29.0 ppm; c : 31.0 ppm; d : 18.0 ppm; e : 13.4 ppm; f : 22.2 ppm; g : 31.7 ppm; h : 29.4 ppm; i : 29.5 ppm; j : 27.2 ppm; and k : 37.4 ppm.

The peak at 27.8 ppm is presumably due to the cyclohexane used as the solvent.

The gel permeation chromatographic analysis of the polymeric product undertaken at 135° C. in a trichlorobenzene solution gave a single peak indicating a very narrow molecular weight distribution. The number-average molecular weight $M_n$ of the polymeric product obtained by making reference to polystyrenes was 6900 and the ratio of the weight-average molecular weight $M_w$ to the number-average molecular weight $M_n$, i.e. $M_w:M_n$, was 1.16. The initiator efficiency $f_1$ of the living polymerization of styrene was about 84% as calculated from the molecular weight. Homopolymeric polystyrene and polyethylene could not be detected so that the block conversion efficiency $f_2$ could be assumed to be 100%. The block copolymer had a glass transition temperature Tg of 91° C. and melting point Tm of 111.3° C.

For reference, the procedure of living polymerization of styrene was repeated in just the same manner as above and the polymerization reaction was terminated by adding isopropyl alcohol without admixture of the tertiary diamine compound. Thereafter, the polymerization mixture was poured into a large volume of methyl alcohol and the precipitates were collected by filtration and dried to give 23.2 g of a polymeric product, which could be identified to be a polystyrene of a monodisperse molecular weight distribution with a $M_w:M_n$ ratio of 1.07 and a number-average molecular weight $M_n$ of 5700.

Example 2

The procedure for the preparation of the block copolymer was substantially the same as in Example 1 except that the polymerization of ethylene in the living polymer solution was conducted first at 50 ° C. for 3 hours and then at room temperature for additional 5 hours. The yield of the polymeric product was 26.3 g.

An infrared absorption spectrum and —C-NMR spectrum of this polymeric product of the thus obtained copolymer, which were substantially identical with those in Example 1, gave about the same conclusion as in Example 1. The gel permeation chromatographic analysis of the polymer gave results that the number-average molecular weight $M_n$ of the product polymer was 7050 with the ratio $M_w:M_n$ of 1.16 indicating a very narrow molecular weight distribution. Further, it was concluded that the ratio $M_w:M_n$ was almost unchanged by extending the polymerization time of ethylene despite the increase in the molecular weight of the polymer. The glass transition temperature Tg and melting point Tm of the polymer were 94° C. and 110.4° C., respectively. The contents of the styrene moiety and ethylene moiety were 53% and 47%, respectively, by mole. The block conversion efficiency $f_2$ was also about 100%.

EXAMPLE 3

The experimental procedure for the preparation of the block copolymer was substantially the same as in Example 1 except that the N,N,N',N'-tetramethyl ethylene diamine was replaced with the same amount of sparteine. The yield of the block copolymer thus obtained was 29.0 g.

The results of the infrared absorption spectrophotometric and $^{13}$C NMR analyses were substantially the same as in Example 1. The gel permeation chromatographic analysis of the polymer gave results that the number-average molecular weight $M_n$ of the product polymer was 6800 with the ratio $M_w:M_n$ of 1.17 indicating a very narrow molecular weight distribution. The contents of the styrene moiety and ethylene moiety were 58% and 42%, respectively, by moles. The block conversion efficiency $f_2$ was also about 100%.

Comparative Example

The experimental procedure was substantially the same as in Example 1 excepting omission of the N,N,N',N'-tetramethy ethylene diamine added to the living polymer solution to give 23.2 g of a polymeric product which was identified to be a monodisperse polystyrene having a number-average molecular weight $M_n$ of 5700 with the ratio $M_w:M_n$ of 1.07 but block copolymerization of ethylene did not take place.

What is claimed is:

1. A block copolymer of styrene and ethylene consisting of a blockwise sequence of polystyrene segments and polyethylene segments, of which the molar ratio of the styrene moiety to the ethylene moiety is in the range from 0.1:99.9 to 99.9:0.1, the number-average molecular weight is in the range from 1000 to 500,000 and the ratio of the weight-average moelcular weight to the number-average molecular weight is in the range from 1.0 to 1.3.

* * * * *